No. 877,504. PATENTED JAN. 28, 1908.
L. HOOVER.
APPARATUS FOR BREAKING OR TRAINING ANIMALS.
APPLICATION FILED APR. 26, 1907.
2 SHEETS—SHEET 1.
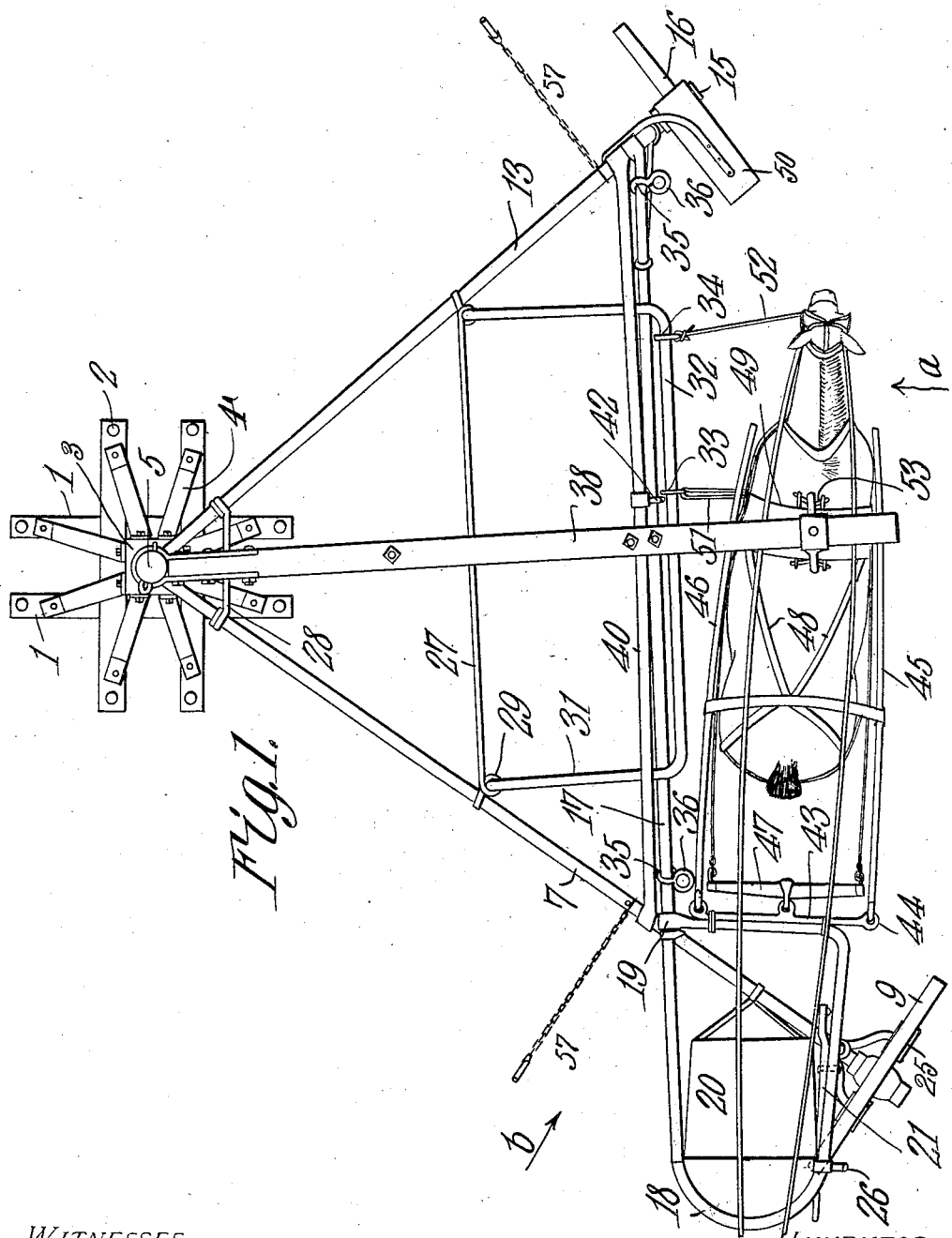
WITNESSES:
INVENTOR.
Loren Hoover,
By C. A. Snow & Co.
ATTORNEYS

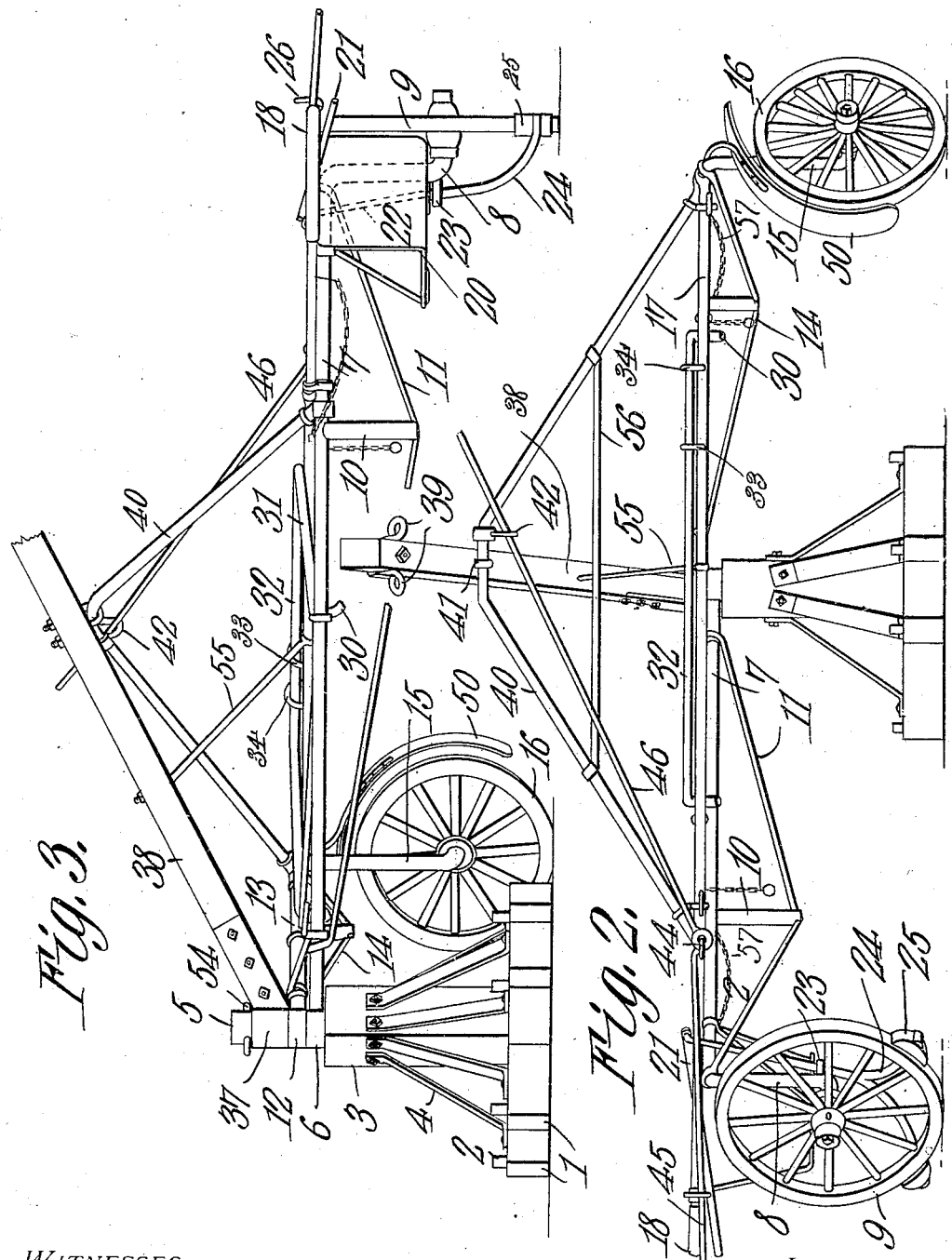

UNITED STATES PATENT OFFICE.

LOREN HOOVER, OF NARKA, KANSAS.

APPARATUS FOR BREAKING OR TRAINING ANIMALS.

No. 877,504.   Specification of Letters Patent.   Patented Jan. 28, 1908.

Application filed April 26, 1907. Serial No. 370,427.

*To all whom it may concern:*

Be it known that I, LOREN HOOVER, a citizen of the United States, residing at Narka, in the county of Republic and State of Kansas, have invented a new and useful Apparatus for Breaking or Training Animals, of which the following is a specification.

This invention relates to apparatus for breaking or training animals and is more particularly an improvement upon the apparatus described and claimed by me in Patent No. 825,970, granted to me on July 17, 1906.

The object of the invention is to provide apparatus to which the animal to be broken can be easily harnessed, there being means provided whereby the shafts can be held out of position so as not to interfere with the placing of the animal in the apparatus.

A still further object is to provide means whereby a horse or other animal is permitted to go forward or backward but is prevented from throwing itself or injuring the trainer.

A still further object is to provide means whereby the speed of the horse can be easily controlled.

Another object is to provide apparatus which is light but durable in construction and which is easy to manipulate.

With these and other objects in view the invention consists of certain novel features of construction and combinations of parts which will be hereinafter more fully described and pointed out in the claims.

In the accompanying drawings is shown the preferred form of the invention.

In said drawings: Figure 1 is a plan view of the apparatus and showing a horse in position therein; Fig. 2 is a front elevation thereof taken in the direction of the arrow *a* shown in Fig. 1; and Fig. 3 is a side elevation taken in the direction of arrow *b* in Fig. 1.

Referring to the figures by characters of reference, 1, 1 are sills constituting the base of the apparatus, the same being preferably disposed in pairs which are arranged at right angles to each other and suitably secured together. These sills are designed to be securely fastened to the ground by means of stakes 2 which are driven through them and into the ground. A post 3 is supported by the center of this post and is connected to the end portions of the sills by means of braces 4.

A stem 5 projects upward from the post and mounted to rotate thereon is a sleeve 6 formed at one end of a frame member 7, the end of which is bent downward and outward as shown at 8 to form an axle for a supporting wheel 9. A hanger 10 extends downward from this frame member 7 and a truss rod 11 is fastened to opposite end portions of said frame member and extends under this hanger so that buckling of the tubular member is prevented and it becomes possible to make the same comparatively light. Another sleeve 12 is revolubly mounted on the stem 5 above the sleeve 6 and is formed at one end of the front frame member 13 which radiates from the stem and is also provided with a truss rod 14 similar to that connected to the rear frame member 7. The frame member 13 terminates in a downwardly and outwardly extending arm 15 constituting the axle of the front wheel 16 of the apparatus. The distance from the stem 5 to the rear wheel 9 is much greater than the distance from said stem to the front wheel 16. A cross bar 17 is connected to the outer end of the front frame member 13 close to the arm 15 and is also connected to the frame member 7, the points of connection between the cross bar 17 and the members 7 and 13 being equi-distant from the stem 5. The rear end portion of the cross bar 17 extends past the member 7 and is looped to form a side supporting frame 18, the front end of said looped portion being extended toward and connected to the cross bar 17 at its point of connection with the member 7, and as shown at 19. A seat 20 is connected to the frame 18 in any preferred manner and also to that portion of the member 7 extending under the frame 18 and fulcrumed upon the frame 18 close to the seat is a lever 21 one end of which is connected to a rod 22 mounted in a guide 23 extending from the axle 8. The lower end of the rod 22 has arms 24 extending therefrom and provided at their ends with brake shoes 25 designed to bear upon the periphery of the wheel 9 at opposite sides of its point of contact with the ground. It is obvious that by pushing downward on the handle of lever 21 these shoes will be brought into contact with the periphery of the wheel so as to hold it against rotation in either direction and by reversing the movement of the lever the wheel can be released. A supporting bracket 26 extends laterally from the frame 18 and is preferably in the form of a hook. This brake is for the purposes hereinafter set forth.

Braces 27 and 28 connect the frame members 7 and 13 at intermediate points and eyes 29 are formed at the ends of the brace 27 to receive the downturned ends 30 of a yoke 31. This yoke bears upon the cross bar 17 and extends thereacross, the outer or intermediate portion 32 of the yoke being preferably disposed parallel with the bar 17 and having rings 33 and 34 loosely mounted thereon. A ring 35 is slidably mounted on each end portion of the cross bar 17 and each of these rings has an eye 36 extending therefrom.

Revolubly mounted on the stem 5 and above the sleeves 6 and 12 is a sleeve 37 through which extends an inclined sweep 38, the free end of which extends above and beyond the cross bar 17 and has eyes 39 connected to the end portion thereof. The end of this sweep is preferably equi-distant from the points of connection between the cross bar 17 and the members 7 and 13 and this outer portion is supported by means of a brace rod 40 which is connected to the members 7 and 13 close to the points of connection between the cross bar 17 and said members 7 and 13. This brace rod is substantially V-shaped, it apex being extended under and secured to the sweep as shown at 41. A supporting bracket or hook 42 is connected to the upper portion of the brace rod 40.

A draft bar 43 is fastened to the inwardly extending end portion 19 of frame 18 and has eyes 44 to which are pivotally connected shafts 45 and 46. A swingletree 47 is arranged between the shafts and is designed to be connected to a harness 48 in the usual manner. This harness may be of any preferred form and is preferably provided with a broad girth strap 49. As shown the front wheel 16 has a guard 50 supported in rear thereof in any desired manner.

In using the apparatus the shaft 45 is swung backward so as to be supported by the bracket 26 and shaft 46 is raised so as to be supported by bracket 42. The harness is then placed upon the horse to be broken after which ropes are connected to the horse and inserted through the eyes 36. By pulling on these ropes the horse will be brought into position beneath the sweep 38 whereupon the girth strap may be fastened to the ring 33 by means of a strap 51 while the halter may be connected by a strap 52 with the front ring 34. The top of the girth strap 49 is then connected to the eyes 39 of the sweep by means of supporting ropes or straps 53. After the horse has been placed in this position the shaft 46 is lowered and connected to the harness and the shaft 45 is then swung downward and also connected to the harness. It is of course to be understood that during this operation of placing the horse in position the brake shoes 25 are in position to hold the apparatus against movement. If preferred, the apparatus can be also held in any desired manner as by tying the wheels or fastening them to a fixed object. After the horse has been secured in the manner described the brake is released and it is apparent that the horse is then free to move forward or backward but will be absolutely prevented from getting out of proper position or from throwing itself. The yoke 31 has a limited vertical movement and therefore the vertical movement of the straps 51 and 52 connected to it is increased so that the horse is given greater freedom of movement than if said straps should be attached to a fixed portion of the frame.

The sweep is preferably held against displacement from the stem 5 by any suitable retaining device such as a cotter pin 54. It is of course to be understood that braces 55 may be placed at desired points under the sweep and also the brace 56 may be used for holding together the opposite portions of the brace rod 40.

It will be obvious that the base made up of the sills 1 can be readily secured to the ground in any desired position simply by driving stakes 2 through the sills, said stakes being sufficiently long to prevent the base from becoming displaced during the swinging of the sweep and the frame around the stem 5.

As shown in Fig. 1 the braces 7 and 13 may be fastened to the ground by chains 57 so as to absolutely hold the apparatus against movement while being placed in position.

What is claimed is:

1. In apparatus of the character described the combination with a post; of a frame disposed to move in a circle therearound, supporting wheels carried by the frame, a sweep above and movable with the frame, separate means for connecting an animal to the frame and sweep, independently movable shafts connected to the frame, and separate means upon the frame and sweep for supporting the shaft out of operative positions.

2. In apparatus of the character described the combination with a post; of a frame connected thereto and mounted to move therearound in a circle, supporting wheels carried by the frame, a yoke movably connected to the frame, a sweep, and separate means for connecting an animal to the yoke and sweep.

3. In apparatus of the character described the combination with a post; of a frame connected thereto and disposed to travel therearound, supporting wheels carried by the frame, a yoke movably connected to the frame, a sweep extending above the yoke and frame and movable with said frame, separate means for connecting an animal to the yoke and sweep, and independently movable shafts connected to the frame.

4. In apparatus of the character described the combination with a post; of a frame connected to and disposed to move therearound, supporting wheels carried by the frame, a seat supported in rear of the frame, means adjacent the seat for controlling the movement of the frame, a sweep above and movable with the frame, and a yoke movably connected to the frame.

5. In apparatus of the character described the combination with a post; of a frame connected thereto and disposed to move therearound, supporting wheels carried by the frame, rope-receiving eyes movably connected to the frame, a yoke movably mounted upon the frame, rings loosely mounted on the yoke, and a sweep supported above the yoke and movable with the frame.

In testimony that I claim the foregoing as my own, I have hereto affixed my signature in the presence of two witnesses.

LOREN HOOVER.

Witnesses:
D. W. DUSKIN,
A. W. SEGERHAMMER.